US012177862B2

(12) United States Patent
Xu et al.

(10) Patent No.: US 12,177,862 B2
(45) Date of Patent: Dec. 24, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Jing Xu, Dongguan (CN); Yanan Lin, Dongguan (CN); Jia Shen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 365 days.

(21) Appl. No.: 17/579,551

(22) Filed: Jan. 19, 2022

(65) Prior Publication Data

US 2022/0141808 A1    May 5, 2022

Related U.S. Application Data

(63) Continuation of application No. PCT/CN2019/110210, filed on Oct. 9, 2019.

(30) Foreign Application Priority Data

Aug. 7, 2019  (WO) ................ PCT/CN2019/099693

(51) Int. Cl.
*H04W 4/00* (2018.01)
*H04W 72/23* (2023.01)
(Continued)

(52) U.S. Cl.
CPC ............ *H04W 72/23* (2023.01); *H04W 48/12* (2013.01); *H04W 52/143* (2013.01)

(58) Field of Classification Search
CPC . H04W 72/23; H04W 72/1263; H04W 72/56; H04W 72/0446
See application file for complete search history.

(56) References Cited

U.S. PATENT DOCUMENTS 11,224,045 B2 *   1/2022  Wu ......................... H04W 4/40
2017/0041908 A1 * 2/2017  Gaal ..................... H04W 72/23
(Continued)

FOREIGN PATENT DOCUMENTS

CN         102415187 A      4/2012
CN         109802732 A      5/2019
(Continued)

OTHER PUBLICATIONS

Extended European Search Report for European Application No. 19940588.7 issued Jul. 1, 2022. 10 pages.
(Continued)

*Primary Examiner* — Abdelnabi O Musa
(74) *Attorney, Agent, or Firm* — PERKINS COIE LLP

(57) ABSTRACT

A wireless communication method, a terminal device and a network device are disclosed, the method includes: receiving, by a terminal device, first Downlink Control Information (DCI); and determining, by the terminal device, a priority and/or a processing time of first information scheduled by the first DCI according to at least one of an indication field in the first DCI, a searchspace for receiving the first DCI, a resource set for receiving the first DCI, a Radio Network Temporary Identifier (RNTI) for scrambling a Cyclic Redundancy Check (CRC) of the first DCI, or a format of the first DCI.

14 Claims, 4 Drawing Sheets

(51) Int. Cl.
 *H04W 48/12* (2009.01)
 *H04W 52/14* (2009.01)

(56) References Cited

U.S. PATENT DOCUMENTS

| | | | |
|---|---|---|---|
| 2017/0353972 | A1 | 12/2017 | Babaei et al. |
| 2018/0338307 | A1 | 11/2018 | Feng |
| 2019/0208540 | A1* | 7/2019 | Kim .................. H04W 74/006 |
| 2021/0345373 | A1* | 11/2021 | Li ........................ H04L 5/0053 |
| 2022/0046452 | A1* | 2/2022 | Jiao ...................... H04W 24/08 |
| 2022/0095352 | A1* | 3/2022 | Gao ...................... H04L 5/0053 |
| 2022/0369362 | A1* | 11/2022 | Goto .................... H04W 72/23 |
| 2023/0224933 | A1* | 7/2023 | Wu ...................... H04L 1/1614 370/329 |

FOREIGN PATENT DOCUMENTS

| | | |
|---|---|---|
| CN | 110036586 A | 7/2019 |
| WO | 2017156788 A1 | 9/2017 |
| WO | 2018070087 A1 | 4/2018 |

OTHER PUBLICATIONS

InterDigital, Inc. "On UCI enhancements for URLLC" R1-1904883; 3GPP TSG RAN WG1 #96bis; Xi'an, China; Apr. 8-12, 2019. 5 pages.
Nokia et al. "On UCI Enhancements for NR URLLC" R1-1906752; 3GPP TSG RAN WG1 #97; Reno, NV, USA; May 13-17, 2019. 14 pages.
First Office Action of the Chinese application No. 202111683473.2, issued on Apr. 22, 2023. 17 pages with English translation.
Second Office Action of the Chinese application No. 202111683473. 2, issued on Jun. 26, 2023. 13 pages with English translation.
International Search Report mailed Apr. 23, 2020 in Application No. PCT/CN2019/099693.
International Search Report mailed Apr. 30, 2020 in Application No. PCT/CN2019/110210.
Vivo , "UL intra UE Tx prioritization for URLLC", UL intra UE Tx prioritization for URLLC, 3GPP TSG RAN WG1 Meeting #95, R1-1812320, Spokane, USA, Nov. 2018.
OPPO , "UCI enhancements for URLLC", UCI enhancements for URLLC, 3GPP TSG RAN WG1 #97, R1-1906448, Reno, USA, May 2019.
MCC Support, Draft Report of 3GPP TSG RAN WG1 #97 v0.3.0, 3GPP TSG RAN WG1 Meeting #98 R1-190xxxx, Prague, Czech Rep, Aug. 26-30, 2019, 165 pages.
Examination Report for European Application No. 19940588.7 issued Dec. 12, 2022. 6 pages.

\* cited by examiner

WIRELESS COMMUNICATION METHOD, TERMINAL DEVICE AND NETWORK DEVICE

CROSS-REFERENCE TO RELATED APPLICATION

The present application is a continuation application of International PCT Application No. PCT/CN2019/110210, filed on Oct. 9, 2020, which claims the priority of the PCT patent application No. PCT/CN2019/099693, filed to the China Patent Office on Aug. 7, 2019, entitled "Wireless Communication Method, Terminal Device, and Network Device", the disclosure of both of which are incorporated by reference herein in their entireties.

TECHNICAL FIELD

Implementations of the present disclosure relate to the field of wireless communication, and particularly to a wireless communication method, a terminal device, and a network device.

BACKGROUND

In a New Radio (NR) system, services with multiple priorities may be transmitted, e.g., an Ultra-Reliable and Low Latency Communication (URLLC) service, an Enhance Mobile Broadband (eMBB) service, or the like. When there is a conflict between transmissions of the URLLC service and the eMBB service, the URLLC service needs to be transmitted preferentially, and the conflict needs to be solved at a physical layer. However, at the physical layer, a terminal device cannot know the priority of the service to be transmitted, therefore, for the terminal device, how to determine the priority of the service to be transmitted is an urgent problem to be solved.

SUMMARY

Implementations of the present disclosure provide a wireless communication method, a terminal device, and a network device, by which a priority of a service to be transmitted can be determined according to a transmission resource of DCI, a content included, or a scrambling mode.

In a first aspect, a wireless communication method is provided, including: receiving, by a terminal device, first Downlink Control Information (DCI); and determining, by the terminal device, a priority and/or a processing time of first information scheduled by the first DCI according to at least one of an indication field in the first DCI, a searchspace for receiving the first DCI, a resource set for receiving the first DCI, a Radio Network Temporary Identifier (RNTI) for scrambling a Cyclic Redundancy Check (CRC) of the first DCI, or a format of the first DCI.

In a second aspect, a wireless communication method is provided, including: sending, by a network device, first Downlink Control Information (DCI), wherein at least one of an indication field in the first DCI, a searchspace for sending the first DCI, a resource set for sending the first DCI, a Radio Network Temporary Identifier (RNTI) for scrambling a Cyclic Redundancy Check (CRC) of the first DCI, or a format of the first DCI is used for determining a priority and/or a processing time of first information scheduled by the first DCI.

In a third aspect, a terminal device is provided, which is used for performing the method in the above first aspect or any possible implementation of the first aspect. Specifically, the terminal device includes units for performing the method in the first aspect or any possible implementation of the first aspect.

In a fourth aspect, a network device is provided, which is used for performing the method in the above second aspect or any possible implementation of the second aspect. Specifically, the network device includes units for performing the method in the second aspect or any possible implementation of the second aspect.

In a fifth aspect, a terminal device is provided, which includes: a processor and a memory. The memory is configured to store a computer program, and the processor is configured to invoke and run the computer program stored in the memory to perform the method according to the first aspect described above or various implementations thereof.

In a sixth aspect, a network device is provided, which includes: a processor and a memory. The memory is used for storing a computer program, and the processor is used for invoking and running the computer program stored in the memory to perform the method according to the second aspect described above or various implementations thereof.

In a seventh aspect, there is provided a chip for implementing the method according to any one of the first and second aspects described above or various implementations thereof.

Specifically, the chip includes a processor configured to call and run a computer program from a memory and a device having the chip installed therein performs the method according to any one of the first and second aspects described above or various implementations thereof.

In an eighth aspect, there is provided a computer readable storage medium for storing a computer program that enables a computer to perform the method according to any one of the first and second aspects described above or various implementations thereof.

In a ninth aspect, a computer program product is provided, which includes computer program instructions, the computer instructions enable a computer to perform the method according to any one of the first and second aspects described above and various implementations thereof.

In a tenth aspect, there is provided a computer program, which, when running on a computer, enables the computer to perform the method according to any one of the first and third aspects described above or various implementations thereof.

Based on the above technical solution, the network device may indicate a priority of uplink data or downlink data scheduled by DCI, or a priority of feedback information of downlink data scheduled by DCI through at least one of an indication field in the DCI, a searchspace for sending the first DCI, a resource set for sending the DCI, a Radio Network Temporary Identifier (RNTI) for scrambling a Cyclic Redundancy Check (CRC) of the DCI, or a format of the DCI, so that a flexible indication of a priority of information to be transmitted can be realized, which is beneficial to take into account of both transmission reliability and scheduling efficiency of the DCI.

DETAILED DESCRIPTION

Technical solutions in implementations of the present disclosure will be described below with reference to the drawings in the implementations of the present disclosure. It is apparent that the implementations described are just a part of implementations of the present disclosure, but not all of the implementations of the present disclosure. According to the implementations of the present disclosure, all other implementations achieved by a person of ordinary skill in the art without making inventive efforts belong to the protection scope of the present disclosure.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunications System (UMTS), a Worldwide Interoperability for Microwave Access (WiMAX) communication system, or a 5G system, etc.

Figure 1:
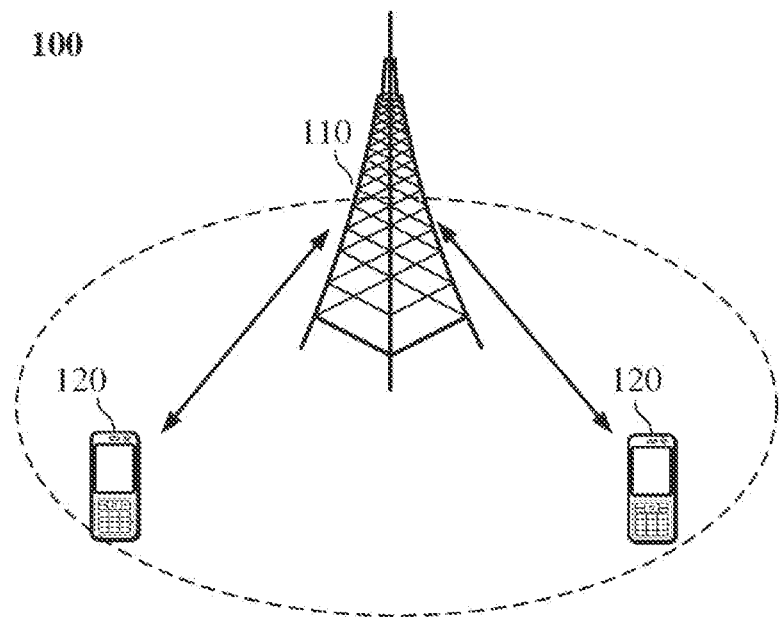
FIG. 1 is a schematic diagram of an application scenario according to an implementation of the present disclosure.

Illustratively, a communication system 100 applied in an implementation of the present disclosure is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAM), or the network device may be a mobile handover center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage area of the network device 110. As used herein, the term "terminal device" includes, but is not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal which may combine a cellular radio phone with data processing, facsimile, and data communication abilities; a Personal Digital Assistant (PDA) that may include a radio phone, a pager, internet/intranet access, a Web browser, a memo pad, a calendar, and/or, a Global Positioning System (GPS) receiver; and a conventional laptop and/or palmtop receiver, or another electronic apparatus including a radio phone transceiver, The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN.

Optionally, Device to Device (D2D) communication may be performed between the terminal devices 120.

Optionally, the 5G system or the 5G network may also be referred to as a New Radio (NR) system or an NR network.

FIG. 1 illustrates one network device and two terminal devices. Optionally, the communication system 100 may include multiple network devices, and other quantities of terminal devices may be included within the coverage area of each network device, which is not limited in the implementations of the present disclosure.

Optionally, the communication system 100 may also include another network entity, such as a network controller, a mobile management entity, or the like, which is not limited in the implementations of the present disclosure.

It should be understood that a device with a communication function in a network/system in the implementations of the present disclosure may also be referred to as a communication device. Taking the communication system 100 shown in FIG. 1 as an example, communication devices may include a network device 110 and terminal devices 120 which have communication functions, and the network device 110 and the terminal devices 120 may be the specific devices described above, and will not be described repeatedly herein. The communication devices may also include other devices in the communication system 100, for example other network entities, such as network controllers and mobile management entities, which is not limited in the implementations of the present disclosure.

It should be understood that the terms "system" and "network" are often used interchangeably herein. The term "arid/or" herein is an association relationship describing associated objects only, indicating that three relationships may exist, for example, A and/or B may indicate three cases: A alone, both A and B, and B alone. In addition, the symbol "/" in this document generally indicates that objects before and after the symbol "/" have an "or" relationship.

Figure 2:
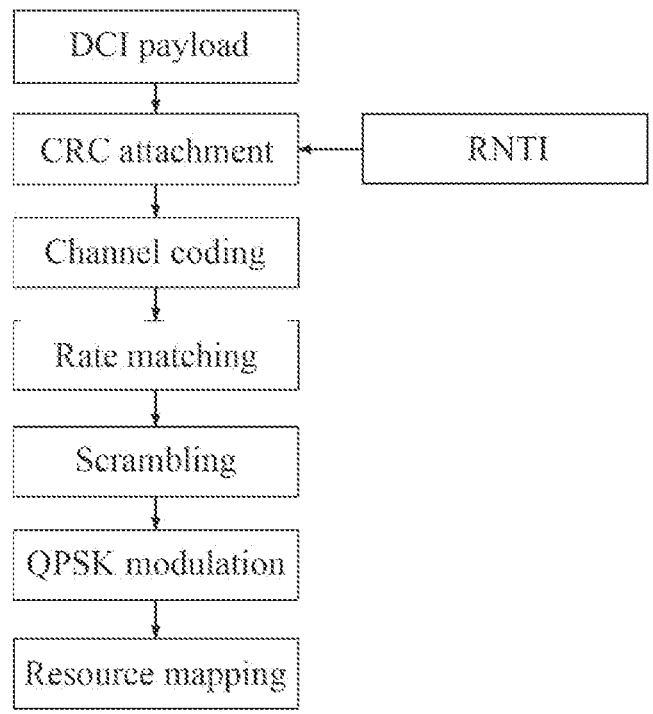
FIG. 2 is a schematic diagram of a processing flow of DCI transmission.

To facilitate understanding the implementations of the present disclosure, firstly, a processing flow of a Downlink Control Information (DCI) transmission is explained. As shown in FIG. 2, one Cyclical Redundancy Check (CRC) generated according to DCI payload is attached after the DCI payload, and the CRC is also scrambled with a Radio Network Temporary identity (RNTI), wherein, different DCI formats, different DCI payload contents, or DCIs with different purposes may correspond to different RNTIs, and channel coding, rate matching, modulation and resource mapping are further performed on information bits with the attached CRC which is scrambled with RNTI to form a Physical Downlink Control Channel (PDCCH) for sending.

Herein, a modulation mode may include one of Binary Phase Shift Keying (BPSK), Quadrature Phase Shift Keying (QPSK), 16-state quadrature amplitude modulation (16QAM), or 64-state quadrature amplitude modulation (64QAM).

Figure 3:
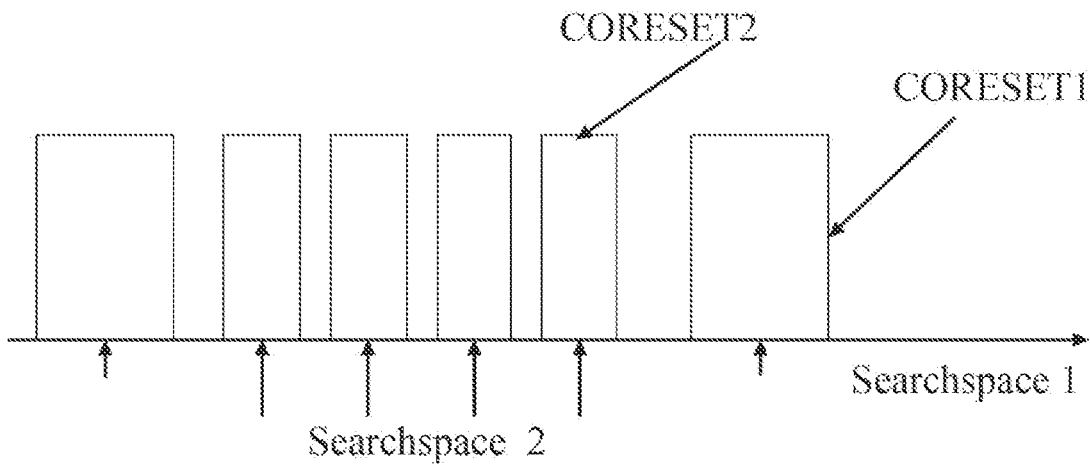
FIG. 3 is a schematic diagram of a CORESET and a searchspace of DCI mapping.

Herein, the resource mapping is limited by a configuration of a Control Resource Set (CORESET) and a searchspace, that is, modulated symbols can only be mapped within the configured CORESET and the corresponding searchspace. Herein, the CORESET may be used for determining a frequency domain position and a frequency domain size of a DCI mappable region, and the searchspace may be used for determining a time domain position of the DCI mappable region. FIG. 3 is a schematic diagram of two sets of CORESETs and searchspaces. It should be noted that the CORESET and the searchspace are configured independently. For example, for the example shown in FIG. 2, the DCI may determine a set of PDCCH resources according to CORESET1 and searchspace1, or it may determine a set of PDCCH resources according to the CORESET1 and searchspace2. The present disclosure is not limited to this.

In some implementations, a priority of data scheduled by the DCI may be determined by the DCI format, the RNTI for scrambling the CRC of the DCI, an indication field in the DCI, and the CORESET or the searchspace where the DCI is located.

For example, different DCI formats may be set to correspond to different priorities, but different DCI formats have their own advantages and disadvantages. For example, for DCI format 0_0, the DCI payload is small, and DCI reliability is high, but flexibility of DC1 scheduling is poor. For DCI format 0_1, the DCI payload is large, the DCI reliability is low, but the flexibility of the DCI scheduling is strong. Generally, the network device may dynamically select the appropriate DCI format according to a channel environment and a scheduling strategy, so that the DCI reliability and the scheduling efficiency achieve optimization. However, if the priority is bound to the DCI format, flexibility of dynamic selection of the DCI format is lost, so that balance between the DCI reliability and the scheduling efficiency cannot be combined.

And a use resource of the DCI format is limited. For example, the DCI format 0_1 and DCI format 1_1 can only be in a UE-Specific searchspace, and when the priority is bound with the DCI format 0_1 or the DCI format 1_1, since a DCI mappable resource is limited, the DCI transmission is easily congested, which leads to a scheduling delay of the DCI.

For another example, different RNTIs may be set to correspond to different priorities, e.g., a Modulation and Coding Scheme-Cell-RNTI (MCS-C-RNTI) and a Cell Radio Network Temporary Identity (C-RNTI) correspond to different priorities respectively. Since the MCS-C-RNTI and the C-RNTI have a contractual relationship with a Modulation and Coding Scheme (MCS) table, there must be a contractual relationship between the priority and the MCS table. For example, if the MCS-C-RNTI corresponds to a high priority, and only MCS table 2 can be used, the C-RNTI corresponds to a low priority, and only MCS table 1 can be used, and efficiency and reliability of a data transmission may be affected due to a constraint of the MCS table.

For another example, an indicator field in the DCI may be set to indicate different priorities. For example, the indicator field may be a newly added indicator field. In this case, the reliability of the DCI may be reduced, and the DCI of the newly added indicator field can only be transmitted in the UE-Specific searchspace, while the DCI transmitted in a common searchspace cannot indicate the priority. Or, a binding relationship between an existing indication field in the DCI and the priority is established, which results in that indication flexibility of the existing indication field decreases. For example, the priority is indicated by Physical Downlink Shared Channel (PDSCH)-HARQ_feedback timing. When a value of the PDSCH-HARQ_feedback timing is less than 14 symbols, the high priority is indicated, otherwise the low priority is indicated. In this way, when the network device schedules a service with the high priority, the PDSCH-HARQ_feedback timing must use a configuration with less than 14 symbols, which limits flexibility of feedback of the service with the high priority.

For another example, if the searchspace or the CORESET where the DCI is located is set to indicate different priorities, a binding relationship between the searchspace or the CORESET and the priority is established, a mappable resource of the DCI is limited, resulting in congestion of the DCI transmission, and then resulting in a scheduling delay of the DCI.

From the above analysis, it may be seen that modes of indicating the priority by single information all have certain application limitations. Therefore, an indication method is needed, which can flexibly indicate the priority of data scheduled by the DCI.

Figure 4:
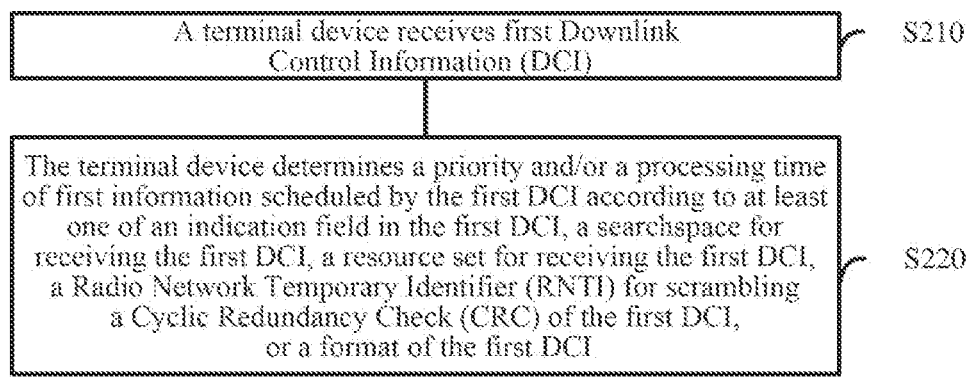
FIG. 4 is a schematic diagram of a wireless communication method in accordance with an implementation of the present disclosure.

FIG. 4 is a schematic flow chart of a wireless communication method in accordance with an implementation of the present disclosure. The method 200 may be performed by the terminal device in the communication system shown in FIG. 1. As shown in FIG. 4, the method at least includes the following contents S210 and S220.

In the S210, a terminal device receives first Downlink Control Information (DCI).

In the S220, the terminal device determines a priority and/or a processing time of first information scheduled by the first DCI according to at least one of an indication field in the first DCI, a searchspace for receiving the first DCI, a resource set for receiving the first DCI, a Radio Network Temporary Identifier (RNTI) for scrambling a Cyclic Redundancy Check (CRC) of the first DCI, or a format of the first DCI.

That is to say, for a terminal device, the terminal device may determine a priority of uplink data or downlink data scheduled by DCI, or a priority and/or a processing time of feedback information of downlink data scheduled by DCI according to information such as a content of the DCI, a transmission resource of the DCI, or a transmission mode (including a scrambling mode).

Correspondingly, the network device may indicate the priority of the uplink data or the downlink data scheduled by the DCI, or the priority and/or the processing time of the feedback information of the downlink data scheduled by the DCI through information such as the content of the DCI, the transmission resource of the DCI, or the transmission mode (including the scrambling mode).

It should be understood that in an implementation of the present disclosure, if the first information is uplink information, the processing time of the first information may include a. time spent on processing the first information before sending the first information, for example, a time spent on modulating the first information. Or if the first information is downlink information, the processing time of the first information may include a time spent on processing the first information after receiving the first information, for example, a time spent on detecting and demodulating the first information.

It should be understood that in an implementation of the present disclosure, the terminal device may also determine a service type of the first information to be transmitted according to at least one of the indication field in the first DCI, the searchspace for receiving the first DCI, the resource set for receiving the first DCI, the Radio Network Temporary Identifier (RNTI) for scrambling the Cyclic Redundancy Check (CRC) of the first DCI, or the format of the first DCI. That is, the terminal device may determine the service type of the uplink data or the downlink data scheduled by the DCI, or the service type of the feedback information of the downlink data scheduled by the DCI according to information such as the content of the DCI, the transmission resource of the DCI, or the transmission mode (including the scrambling mode), etc. For example, an URLLC service, or an eMBB service, etc.

It should be understood that in an implementation of the present disclosure, the resource set of the DCI may include a frequency domain resource of the DCI, for example, the CORESET, or may include another transmission resource, for example, a code domain resource, etc., which is not limited in an implementation of the present disclosure. In the following description, for example, the resource set of the DCI is the CORESET of the DCI, but an implementation of the present disclosure is not limited to this.

Correspondingly, the network device may indicate the service type of the uplink data or the downlink data scheduled by the DCI, or the service type of the feedback information of the downlink data scheduled by the DCI through information such as the content of the DCI, the transmission resource of the DCI, or the transmission mode (including the scrambling mode). etc.

Optionally, in some implementations, the terminal device may further determine the priority or the processing time of the first information according to the service type of the first information.

Optionally, the service type and the priority may have a corresponding relationship, for example, the URLLC service corresponds to a first priority, the eMBB service corresponds to a second priority, and the first priority is higher than the second priority. The terminal device may determine the priority of the first information according to the determined service type in combination with the corresponding relationship.

Optionally, the service type and the processing time may also have a corresponding relationship, for example, the URLLC service corresponds to a first processing time, the eMBB service corresponds to a second processing time, and the first processing time is less than the second processing time. The terminal device may determine the processing time of the first information according to the determined service type in combination with the corresponding relationship.

Optionally, in some implementations, after determining, according to the above information, the priority of the first information, the terminal device may further determine the processing time of the first information according to the priority of the first information. For example, if the priority of the first information is the first priority, it may be determined that the processing time of the first information is the first processing time, or if the priority of the first information is the second priority, it may be determined that the processing time of the first information is the second processing time, wherein the first processing time is less than the second processing time if the first priority is higher than the second priority.

Or, in another implementation, the terminal device may determine, according to the above information, the service type of the first information, and further determine the processing time of the first information according to the service type of the first information. For example, if the service type of the first information is a first service type, such as the URLLC service, it may be determined that the processing time of the first information is the first processing time, or if the service type of the first information is a second service type, such as the eMBB service, it may be determined that the processing time of the first information is the second processing time, wherein the first processing time is less than the second processing time.

To sum up, the wireless communication method 200 according to an implementation of the present disclosure may at least include the following implementations.

A first implementation is that, the terminal device determines the priority of the first information according to at least one of the indication field in the first DCI, the searchspace for receiving the first DCI, the resource set for receiving the first DCI, the Radio Network Temporary Identifier (RNTI) for scrambling the Cyclic Redundancy Check (CRC) of the first DCI, or the format of the first DCI.

A second implementation is that, the terminal device determines the service type of the first information according to at least one of the indication field in the first DCI, the searchspace for receiving the first DCI, the resource set for receiving the first DCI, the Radio Network Temporary Identifier (RNTI) for scrambling the Cyclic Redundancy Check (CRC) of the first DCI, or the format of the first DCI. A third implementation is that, the terminal device determines the service type of the first information according to at least one of the indication field in the first DCI, the searchspace for receiving the first DCI, the resource set for receiving the first DCI, the Radio Network Temporary Identifier (RNTI) for scrambling the Cyclic Redundancy Check (CRC) of the first DCI, or the format of the first DCI, and further determines the priority of the first information according to the service type of the first information.

A fourth implementation is that, the terminal device determines the processing time of the first information according to at least one of the indication field in the first DCI, the searchspace for receiving the first DCI, the resource set for receiving the first DCI, the Radio Network Temporary Identifier (RNTI) for scrambling the Cyclic Redundancy Check (CRC) of the first DCI, or the format of the first DCI.

A fifth implementation is that, the terminal device determines the priority of the first information according to at least one of the indication field in the first DCI, the searchspace for receiving the first DCI, the resource se for receiving the first DCI, the Radio Network Temporary Identifier (RNTI) for scrambling the Cyclic Redundancy Check (CRC) of the first DCI, or the format of the first DCI, and determines the processing time of the first information according to the priority of the first information.

A sixth implementation is that, the terminal device determines the service type of the first information according to at least one of the indication field in the first DCI, the searchspace for receiving the first DCI, the resource set for receiving the first DCI, the Radio Network Temporary Identifier (RNTI) for scrambling the Cyclic Redundancy Check (CRC) of the first DCI, or the format of the first DCI, and determines the processing time of the first information according to the service type of the first information.

Hereinafter, specific implementation modes of the first implementation and the fourth implementation are described with specific examples, and implementation modes of other implementations are similar, so they will not be repeated here again.

Implementation 1-1: the terminal device may determine the priority of the first information according to the searchspace for receiving the first DCI and the indication field in the first DCI.

For example, if the terminal device detects the first DCI in a common searchspace, it may determine that the priority of the first information is the first priority. Optionally, the first priority may be predefined, or configured by the network device. Optionally, as an example, the first priority may be a highest priority among multiple priorities.

For another example, if the terminal device detects the first DCI in a UE-Specific SearchSpace, it may further determine the priority of the first information based on the indication field in the first DCI.

As an example, the indication field in the first DCI may be a first indication field for indicating the priority. In this case, the terminal device may determine the priority indicated by the first indication field as the priority of the first information. For example, if the first indication field indicates the first priority, the priority of the first information may be determined as the first priority, or if the first indication field indicates the second priority, the priority of the first information may be determined as the second priority.

As another example, the indication field in the first DCI may be a second indication field in the first DCI, wherein the second indication field may be used for indicating other information except the priority, for example, the other information may be a Time domain resource assignment, a Hybrid Automatic Repeat reQuest (HARQ) process number, or a Physical Downlink Shared Channel (PDSCH)-HARQ_feedback timing.

Optionally, different values of the second indication field may be used for indicating different priorities, for example, a value of the PDSCH-HARQ_feedback Timing is a first value (for example, less than 14 symbols), indicating that the priority of the first information is the first priority, or the value of the PDSCH-HARQ_feedback Timing is another value (for example, greater than 14 symbols), indicating that the priority of the first information is the second priority, wherein the first priority is higher than the second priority.

Further, the terminal device may transmit the first information according to the priority of the first information.

As an example, if there is overlapping between a time domain resource of the first information and a time domain resource of second information to be transmitted, the terminal device may determine information to be transmitted preferentially according to the priority of the first information and a priority of the second information, For example, if the priority of the first information is the first priority, the priority of the second information is the second priority, and the first priority is higher than the second priority, the terminal device may preferentially transmit the first information. Here, the second information may be second uplink data scheduled by second DCI, or second downlink data scheduled by the second DCI, or feedback information of the second downlink data scheduled by the second DCI, and a mode for determining the priority of the second information refers to the mode for determining the priority of the first information, which is not repeated here again.

Optionally, if both the first information and the second information are the uplink data, there is overlapping between the time domain resource of the first information and the time domain resource of the second information, which may be that there is overlapping between time domain resources of a first data channel carrying the first information and a second data channel carrying the second information; or, if both the first information and the second information are feedback information, there is overlapping between the time domain resource of the first information and the time domain resource of the second information, which may be that there is overlapping between time domain resources of a first control channel carrying the first information and a second control channel carrying the second information.

It should be understood that overlapping of the time domain resources here may be overlapping of part of the time domain resources, or overlapping of all of the time domain resources.

In some other implementations, the terminal device may process the first information according to the priority of the first information.

For example, if the priority of the first information is a high priority, the terminal device may process the first information with a faster processing time. For another example, if the first information is feedback information, the terminal device may also determine a resource set or a PDSCH_to_HARQ feedback interval for transmitting the feedback information according to the priority of the first information. For example, if the priority of the first information is the high priority, it may be determined that the PDSCH_to_HARQ feedback interval of the feedback information is relatively small, otherwise, it is determined that the PDSCH_to_HARQ feedback interval is relatively large.

Therefore, in the implementation 1-1, the network device may flexibly indicate priority information through the indication field of the DCI in the UE-Specific searchspace, and may obtain certain priority information without changing the DCI format of the common searchspace.

Implementation 1-2: the terminal device may determine the processing time of the first information according to the searchspace for receiving the first DCI and the indication field in the first DCI.

For example, if the terminal device detects the first DCI in the common searchspace, it may be determined that the processing time of the first information is the first processing time. Optionally, the first processing time may be predefined, or configured by the network device, for example, 2 symbols, or 4 symbols, etc. Optionally, as an example, the first processing time may be a shortest processing time among multiple processing times.

For another example, if the terminal device detects the first DCI in the UE-Specific SearchSpace, it may further determine the processing time of the first information based on the indication field in the first DCI.

As an example, the indication field in the first DCI may be a third indication field for indicating the processing time. In this case, the terminal device may determine the processing time indicated by the third indication field as the processing time of the first information. For example, if the third indication field indicates the first processing time, the processing time of the first information may be determined as the first processing time, or if the third indication field indicates the second processing time, the processing time of the first information may be determined as the second processing time.

As another example, the indication field in the first DCI may be the second indication field in the first DCI, wherein the second indication field may be used for indicating other information except the processing time, for example, a Time domain resource assignment, a Hybrid Automatic Repeat reQuest (HARQ) process number, or Physical Downlink Shared Channel (PDSCH)-HARQ_feedback timing.

Optionally, different values of the second indication field may be used for indicating different processing times, for example, the value of the PDSCH-HARQ_feedback Timing is a first value (for example, less than 14 symbols), indicating that the processing time of the first information is the first processing time, or the value of the PDSCH-HARQ-_feedback Timing is another value (for example, greater than 14 symbols), indicating that the processing time of the first information is the second processing time, wherein the first processing time is less than the second processing time.

Further, the terminal device may process the first information according to the processing time of the first information.

For example, if the processing time of the first information is the first processing time, the terminal device may process the first information with a faster processing time.

For example, if the processing time of the first information is the second processing time, the terminal device may process the first information with a slower processing time.

Therefore, in the implementation 1-2, the network device may flexibly indicate the processing time through the indication field of the DCI in the UE-Specific searchspace, and may obtain certain processing time information without changing the DCI format of the common searchspace, which is convenient for the terminal device to process the first information with an appropriate processing time, which improves utilization rate of system resources, and can further improve system performance.

Implementation 1-3: the terminal device may determine the priority of the first information according to the searchspace for receiving the first DCI and the RNTI for scrambling the CRC of the first DCI.

For example, if the terminal device detects the first DCI in the common searchspace, it may determine that the priority of the first information is the first priority.

For another example, if the terminal device detects the first DCI in the UE-Specific searchspace, it may further determine the priority of the first information according to the RNTI for scrambling the CRC of the first DCI.

For example, the RNTI for scrambling the CRC of the DCI may have a corresponding relationship with a priority of information to be transmitted, and the terminal device may determine the priority of the first information according to the RNTI for scrambling the CRC of the first DCI, in combination with the corresponding relationship. Optionally, the corresponding relationship may be predefined, or configured by the network device.

As an example, if the RNTI for scrambling the CRC of the first DCI is a first RNTI, the first information is determined as the first priority, or if the RNTI for scrambling the CRC of the first DCI is a second RNTI, the first information is determined as the second priority. Optionally, the first priority is predefined, or configured by the network device; and the second priority is predefined, or configured by the network device.

In some implementations, the first priority is the high priority, and the second priority is the low priority.

As an example, the first RNTI is a Modulation and Coding Scheme-Cell-RNTI (MCS-C-RNTI), and the second RNTI may be another RNTI except the MCS-C-RNTI, for example, the second RNTI may be a Cell Radio Network Temporary Identity (C-RNTI); or, vice versa.

Assuming that the priority of the information to be transmitted includes the first priority and the second priority, existing RNTIs may be used for indicating the first priority and the second priority respectively, for example, one kind of existing RNTI is used for indicating the first priority, and another kind of existing RNTI is used for indicating the second priority. Or, if there are more priorities, more existing RNTIs may be used for indicating.

As another example, the second RNTI is the MCS-C-RNTI or the C-RNTI, and the first RNTI is another RNTI except the MCS-C-RNTI and the C-RNTI.

Assuming that the priority of the information to be transmitted includes the first priority and the second priority, an RNTI may be newly added for indicating the first priority, and one or more existing RNTIs may be used for indicating the second priority. Or, if there are more priorities, multiple RNTIs may be newly added or more kinds of existing RNTIs may be used, for indicating these multiple priorities.

It should be understood that in an implementation of the present disclosure, the corresponding relationship between an RNTI and a priority may be one to one, that is, one RNTI indicates one priority, or it may be many to one, that is, multiple RNTIs indicate one priority, which is not limited by an implementation of the present disclosure.

Further, the terminal device may process or transmit the first information according to the priority of the first information. For a specific implementation, reference is made to the related. description of the implementation 1-1, which will not be repeated here again.

Therefore, in the implementation 1-3, the network device may flexibly indicate the priority information by the RNTI for scrambling the CRC the DCI in the UE-Specific searchspace, and can still obtain the certain priority information without changing the DCI format of the common searchspace.

Implementation 1-4: the terminal device may determine the processing time of the first information according to the searchspace for receiving the first DCI and the RNTI for scrambling the CRC of the first DCI.

For example, if the terminal device detects the first DCI in the common searchspace, the processing time of the first information may be determined as the first processing time.

For another example, if the terminal device detects the first DCI in the UE-Specific searchspace, it may further determine the processing time of the first information according to the RNTI for scrambling the CRC of the first DCI.

For example, the RNTI for scrambling the CRC of the DCI may have a corresponding relationship with a processing time of the information to be transmitted, and the terminal device may determine the processing time of the first information according to the RNTI for scrambling the CRC of the first DCI, in combination with the corresponding relationship. Optionally, the corresponding relationship may be predefined, or configured by the network device.

As an example, if the RNTI for scrambling the CRC of the first DCI is the first RNTI, the processing time of the first information is determined as the first processing time, or if the RNTI for scrambling the CRC of the first DCI is the second RNTI, the processing time of the first information is determined as the second processing time.

Optionally, the first processing time is predefined, or configured by the network device; and the second processing time is predefined, or configured by the network device.

In some implementations, the first processing time is less than the second processing time.

As an example, the first RNTI is the MCS-C-RNTI, and the second RNTI may be another RNTI except the MCS-C-RNTI, for example, the second RNTI may be the C-RNTI; or, vice versa.

Assuming that the processing time of the information to be transmitted includes the first processing time and the second processing time, the existing RNTIs may be used for indicating the first processing time and the second processing time respectively, for example, one kind of existing RNTI is used for indicating the first processing time, and another kind of existing RNTI is used for indicating the second processing time. Or, if there are more kinds of processing time, more existing RNTIs may be used for indicating.

As another example, the second RNTI is the MCS-C-RNTI or the C-RNTI, and the first RNTI is another RNTI except the MCS-C-RNTI and the C-RNTI.

Assuming that the processing time of the information to be transmitted includes the first processing time and the second processing time, an RNTI may be newly added for indicating the first processing time, and one or more existing RNTIs may be used for indicating the second processing time. Or, if there are more kinds of processing time, multiple RNTIs may be newly added or more kinds of existing RNTIs may be used, for indicating these multiple kinds of processing time.

It should be understood that in an implementation of the present disclosure, the corresponding relationship between the RNTI and the processing time may be one to one, that is, one RNTI indicates one kind of processing time, or it may be many to one, that is, multiple RNTIs indicate one kind of processing time, which is not limited by an implementation of the present disclosure.

Further, the terminal device may process the first information according to the processing time of the first information. For a specific implementation, reference is made to the related description of the implementation 1-1, which will not be repeated here again.

Therefore, in the implementation 1-4, the network device may flexibly indicate the processing time by the RNTI for scrambling the CRC of the DCI in the UE-Specific searchspace, and can still obtain certain processing time information without changing the DCI format of the common searchspace.

Implementation 1-5: the terminal device may determine the priority of the first information according to the searchspace for receiving the first DCI, the indication field in the first DCI, and the RNTI for scrambling the CRC of the first DCI.

For example, if the terminal device detects the first DCI in the common searchspace, the terminal device may determine the priority of the first information according to the RNTI for scrambling the CRC of the first DCI. Here, a mode of determining the priority of the first information according to the RNTI of the CRC of the first DCI may refer to the related description of the implementation 1-2, and will not be repeated here again for brevity.

For another example, if the terminal device detects the first DCI in the UE-Specific searchspace, it may further determine the priority of the first information, according to the RNTI for scrambling the CRC of the first DCI or the indication field in the first DCI. Here, a mode of determining the priority of the first information according to the indication field of the first DCI or the RNTI for scrambling the CRC of the first DCI may refer to the related descriptions of the implementations 1-1 and 1-3, respectively, and will not be repeated here again for brevity.

Further, the terminal device may process or transmit the first information according to the priority of the first information. For a specific implementation., reference is made to the related description of the implementation 1-1, which will not be repeated here again.

Therefore, in the implementation 1-5, for the DCI transmitted in the UE-Specific searchspace, the network device may flexibly indicate the priority of the first information through the RNTI for scrambling the CRC of the DCI or the indication field of the DCI. For the DCI transmitted in the common searchspace, without changing the DCI format of the common searchspace, the network device may flexibly indicate the priority of the first information based on the RNTI for scrambling the CRC, thus the priority can be indicated flexibly through the DCI transmitted in the common searchspace.

Implementation 1-6: the terminal device may determine the processing time of the first information according to the searchspace for receiving the first DCI, the indication field in the first DCI, and the RNTI for scrambling the CRC of the first DCI.

For example, if the terminal device detects the first DCI in the common searchspace, the terminal device may determine the processing time of the first information according to the RNTI for scrambling the CRC of the first DCI. Here, a mode of determining the processing time of the first information according to the RNTI of the CRC of the first DCI may refer to the related descriptions of the implementations 1-4, and will not be repeated here again for brevity.

For another example, if the terminal device detects the first DCI in the UE-Specific searchspace, it may further determine the processing time of the first information according to the RNTI for scrambling the CRC of the first DCI, or the indication field in the first DCI. Here, a mode of determining the processing time of the first information according to the indication field of the first DCI or the RNTI for scrambling the CRC of the first DCI may refer to the related descriptions of the implementations 1-2 and 1-4 respectively, and will not be repeated here again for brevity, Further, the terminal device may process or transmit the first information according to the processing time of the first information. For a specific implementation, reference is made to the related description of the implementation 1-2, which will not be repeated here again.

Therefore, in the implementation 1-6, for the DCI transmitted in the UE-Specific searchspace, the network device may flexibly indicate the processing time of the first information through the RNTI for scrambling the CRC of the DCI, or the indication field of the DCI. For the DCI transmitted in the common searchspace, without changing the DCI format of the common searchspace, the network device may flexibly indicate the processing time of the first information based on the RNTI for scrambling the CRC, thus the processing time can be indicated flexibly through the DCI transmitted in the common searchspace.

Implementation 1-7: the terminal device determines the priority of the first information according to the searchspace or the CORESET for receiving the first DCI, in combination with the indication field the first DCI or the RNTI for scrambling the CRC of the first DCI.

In the implementation 1-7, the searchspace or the CORESET of the DCI has a corresponding relationship with the priority of the information to be transmitted. Optionally, the corresponding relationship may be predefined, or configured by the network device. For example, the searchspace of the DCI may include a first searchspace and a second searchspace, wherein the first searchspace corresponds to the first priority, and the second searchspace corresponds to the second priority. For another example, the CORESET of the DCI may include a first CORESET and a second CORESET, wherein the first CORESET corresponds to the first priority, and the second CORESET corresponds to the second priority.

Optionally, in the implementation, the first searchspace and the second searchspace are different UE-Specific searchspaces, and the first searchspace and the second searchspace may be not overlapped, or may be partially overlapped.

Optionally, in the implementation, the first CORESET and the second CORESET are different CORESETs, and the first CORESET and the second CORESET may be not overlapped, or may be partially overlapped.

For example, if the searchspace or the CORESET for receiving the first DCI belongs to only one searchspace or CORESET, the terminal device may determine a priority corresponding to one searchspace or CORESET as the priority of the first information.

For another example, if the searchspace or the CORESET for receiving the first DCI belongs to at least two searchspaces or CORSETs, the terminal device may further determine the priority of the first information according to the indication field in the first DCI or the RNTI for scrambling the CRC of the first DCI.

In another implementation, if the resource set for receiving the first DCI belongs to a first resource set, a priority corresponding to the first resource set is determined as the priority of the first information, and/or, a processing time corresponding to the first resource set is determined as the processing time of the first information. And if the resource set for receiving the first DCI belongs to a second resource set, the priority and/or the processing time of the first information is determined according to the indication field in the first DCI or the RNTI for scrambling the CRC of the first DCI.

In another implementation, if the searchspace for receiving the first DCI belongs to the first searchspace, a priority corresponding to the first searchspace is determined as the priority of the first information, and/or a processing time corresponding to the first searchspace is determined as the processing time of the first information. And if the searchspace for receiving the first DCII belongs to the second searchspace, the priority and/or the processing time of the first information is determined according to the indication field in the first DCI or the RNTI for scrambling the CRC of the first DCI.

Specifically, a mode of determining the priority of the first information according to the indication field in the first DCI or the RNTI for scrambling the CRC of the first DCI may refer to the related descriptions of the implementation 1-1 and the implementation 1-3 respectively, and will not be repeated here again.

Further, the terminal device may transmit or process the first information according to the priority of the first information. For a specific implementation, reference is made to the related descriptions of the previous implementations.

In the implementation, since the searchspace or the CORESET has a corresponding relationship with the priority of the information to be transmitted, that is, before the DCI is detected, the terminal device may determine the priority of the first information according to a location of the searchspace or the CORESET for detecting the DCI. In this case, the terminal device may detect the DCI with an appropriate detection mode.

For example, if the first DCI is detected in the first searchspace, the first searchspace corresponds to the first priority, the terminal device may determine that the priority of the first information is the first priority, that is, the high priority, and further, the terminal device may detect the first DCI in a relatively fast detection mode. Or if the second DCI is detected in the second searchspace, the second searchspace corresponds to the second priority, the terminal device may determine that the priority of the first information is the second priority, that is, the low priority, and further, the terminal device may detect the second DCI in a relatively slow detection mode.

Therefore, in the implementation 1-7, the network device may flexibly indicate the priority through the UE-Specific searchspace and the indication field of the DCI. or the UE-Specific searchspace and the RNTI for scrambling the CRC, and can determine the priority of the information to be transmitted before the DCI is received, so the DCI can be detected in an appropriate detection mode, which is beneficial to improve system performance.

Implementation 1-8: the terminal device determines the processing time of the first information according to the searchspace or the CORESET for receiving the first DCI, in combination with the indication field in the first DCI or the RNTI for scrambling the CRC of the first DCI.

In the implementation 1-8, the searchspace or the CORESET of the DCI has a corresponding relationship with the processing time of the information to be transmitted. Optionally, the corresponding relationship may be predefined, or configured by the network device. For example, the searchspace of the DCI may include the first searchspace and the second searchspace, wherein the first searchspace corresponds to the first processing time, and the second searchspace corresponds to the second processing time. For another example, the CORESET of the DCI may include the first CORESET and the second CORESET, wherein the first CORESET corresponds to the first processing time, and the second CORESET corresponds to the second processing time.

Optionally, in the implementation, the first searchspace and the second searchspace are different UE-Specific searchspaces, and the first searchspace and the second searchspace may be not overlapped, or may be partially overlapped. Optionally, in this implementation, the first CORESET and the second CORESET are different CORESETs, and the first CORESET and the second CORESET may be not overlapped, or may be partially overlapped.

For example, if the searchspace or the CORESET for receiving the first DCI belongs to only one searchspace or CORESET, the terminal device may determine a processing time corresponding to one searchspace or CORESET as the processing time of the first information.

For another example, if the searchspace or the CORESET for receiving the first DCI belongs to at least two searchspaces or CORSETs, the terminal device may further determine the processing time of the first information according to the indication field in the first DCI or the RNTI for scrambling the CRC of the first DCI.

Specifically, a mode of determining the processing time of the first information according to the indication field in the first DCI or the RNTI for scrambling the CRC of the first DCI may refer to the related descriptions of the implementations 1-2 and 1-4 respectively, and will not be repeated here again.

In the implementation, since the searchspace or the CORESET has a corresponding relationship with the processing time of the information to be transmitted, that is, before the DCI is detected, the terminal device may determine the processing time of the first information according to the location of the searchspace or the CORESET for detecting the DCI. In this case, the terminal device may detect the DCI in an appropriate detection mode.

For example, if the first DCI is detected in the first searchspace, the first searchspace corresponds to the first processing time, the terminal device may determine that the processing time of the first information is the first processing time, that is, a short processing time, and furthermore, the terminal device may detect the first DCI in a relatively fast detection mode. Or if the second DCI is detected in the second searchspace, the second searchspace corresponds to the second processing time, the terminal device may determine that the processing time of the first information is the second processing time, that is, a long processing time, and furthermore, the terminal device may detect the second DCI in a relatively slow detection mode.

Therefore, in the implementation 1-8, the network device may flexibly indicate the processing time through the UE-Specific searchspace and the indication field of the DCI, or the UE-Specific searchspace and the RNTI for scrambling the CRC, and can determine the processing time of the information to be transmitted before the DCI is received, so the DCI can be detected in an appropriate detection mode, which is beneficial to improve the system performance.

Implementation 1-9: the terminal device determines the priority of the first information according to the format of the first DCI, in combination with the indication field in the first DCI or the RNTI for scrambling the CRC.

For example, if the format of the first DCI is a specific DCI format, the specific DCI format including a first indication field for indicating a priority, in this case, the terminal device may determine the priority indicated by the first indication field in the first DCI as the priority of the first information.

For another example, if the format of the first DCI is another DCI format except the specific DCI format, that is, the format of the first DCI does not include a first indication field for indicating the priority, in this case, the terminal device may determine the priority of the first information according to a second indication field in the first DCI, or the RNTI for scrambling the CRC of the first DCI, wherein the second indication field may be used for indicating other information except the priority.

Specifically, a mode of determining the priority of the first information according to the second indication field in the first DCI refers to the specific implementation mode of determining the priority of the first information according to the second indication field in the first DCI in the implementation 1-1, and a specific implementation mode of determining the priority of the first information according to the RNTI for scrambling the CRC of the first DCI may refer to the specific implementation mode of the implementation 1-3, which will not be repeated here again.

Therefore, in the implementation 1-9, the network device may flexibly indicate the processing time through different DCI formats and indication fields, or different DCI formats and RNTIs, thus the dependence of the DCI transmission on the DCI format can be reduced, and the problem of limited mappable resources of the DCI caused by the DCI format can be further decreased.

It should be understood that in another implementation, the terminal device may also directly determine the priority of the first information according to the DCI format. For example, if the DCI format is a newly added format, such as a specific DCI format including the first indication field, the priority of the first information may directly be determined as the first priority, and if the DCI format is another existing format, such as DCI format 0_0, or DCI format 0_1, the priority of the first information may directly be determined as the second priority.

Implementation 1-10: the terminal device determines the processing time of the first information according to the format of the first DCI, in combination with the indication field in the first DCI or the RNTI for scrambling the CRC.

For example, if the format of the first DCI is a specific DCI format, the specific DCI format including a third indication field for indicating processing time, in this case, the terminal device may determine the processing time indicated by the third indication field in the first DCI as the processing time of the first information.

For another example, if the format of the first DCI is another DCI format except the specific DCI format, that is, the format of the first DCI does not include a third indication field for indicating the processing time, in this case, the terminal device may determine the processing time of the first information according to the second indication field in the first DCI or the RNTI for scrambling the CRC of the first DCI, wherein the second indication field may be used for indicating other information except the processing time.

Specifically, a mode of determining the processing time of the first information according to the second indication field in the first DCI refers to the specific implementation mode of determining the processing time of the first information according to the second indication field in the first DCI in the implementation 1-2, and a specific implementation mode of determining the processing time of the first information according to the RNTI for scrambling the CRC of the first DCI may refer to the specific implementation mode of the implementation 1-4, which will not be repeated here again.

Therefore, in the implementation 1-10, the network device may flexibly indicate the processing time through different DCI formats and indication fields or different DCI formats and RNTIs, thus the dependence of the DCI transmission on the DCI format can be reduced, and the problem of limited mappable resources of the DCI caused by the DCI format can be further decreased.

It should be understood that in another implementation, the terminal device may also directly determine the processing time of the first information according to the DCI format. For example, if the DCI format is a newly added format, such as a specific DCI format including the third indication field, the processing time of the first information may directly be determined as the first processing time, and if the DCI format is another existing format, such as the DCI format 0_0, or the DCI format 0_1, the processing time of the first information may directly be determined as the second processing time.

The wireless communication method according to an implementation of the present disclosure is described in detail above from a perspective of the terminal device in connection with FIG. 4. Next, a wireless communication method according to another implementation of the present disclosure will be described in detail from a perspective of the network device in connection with FIG. 5. It should be understood that the description of the network device corresponds to the description of the terminal device, and similar description may refer to the above description, which will not be repeated herein to avoid repetition.

Figure 5:
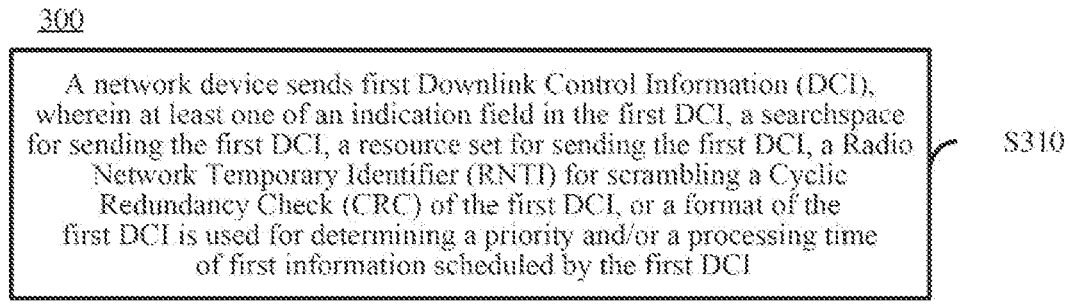
FIG. 5 is a schematic diagram of another wireless communication method in accordance with an implementation of the present disclosure.

FIG. 5 is a schematic flow chart of a wireless communication method 300 according to another implementation of the present disclosure. The method 300 may be performed by the network device in the communication system shown in FIG. 1. As shown in FIG. 5, the method 300 includes S310 and S320.

In the S310, a network device sends first Downlink Control Information (DCI), wherein at least one of an indication field in the first DCI, a searchspace for sending the first DCI, a resource set for sending the first DCI, a Radio Network Temporary identifier (RNTI) for scrambling a Cyclic Redundancy Check (CRC) of the first DCI, or a format of the first DCI is used for determining a priority and/or a processing time of first information scheduled by the first DCI.

Optionally, in some implementations, the method 300 further includes: determining at least one of the indication field in the first DCI, the searchspace for sending the first DCI, a CORESET for sending the first DCI, the RNTI for scrambling the CRC of the first DCI, or the format of the first DCI according to the priority of the first information.

Method implementations of the present disclosure are described in detail above with reference to FIGS. 4 to 5, device implementations of the present disclosure are described in detail below with reference to FIGS. 6 to 10. It should be understood that the device implementations and the method implementations correspond to each other, and description of the method implementations may be referred to for similar description of the device implementations.

Figure 6:
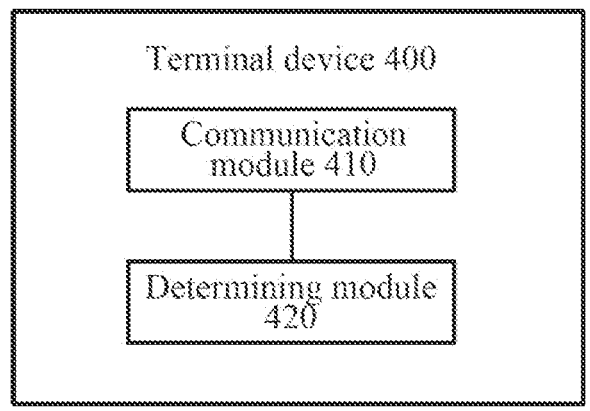
FIG. 6 is a schematic block diagram of a terminal device in accordance with an implementation of the present disclosure.

FIG. 6 is a schematic block diagram of a terminal device 400 according to an implementation of the present disclosure. As shown in FIG. 6, the terminal device 400 includes a communication unit 310 and a processing unit 320.

The communication module 410 is configured to receive first Downlink Control Information (DCI).

The determining module 420 is configured to determine a priority and/or a processing time of first information scheduled by the first DCI according to at least one of an indication field in the first DCI, a searchspace for receiving the first DCI, a resource set for receiving the first DCI, a Radio Network Temporary Identifier (RNTI) for scrambling a Cyclic Redundancy Check (CRC) of the first DCI, or a format of the first DCI.

Optionally, in sonic implementations, the determining module 420 is specifically configured to: if the searchspace for receiving the first DCI is a common searchspace, determine that the priority of the first information is a first priority, and/or the processing time of the first information is a first processing time; and/or if the searchspace for receiving the first DCI is a UE-Specific searchspace, determine the priority and/or the processing time of the first information scheduled by the first DCI according to the indication field in the first DCI, or the RNTI for scrambling the CRC of the first DCI.

Optionally, in some implementations, the first priority is predefined, or configured by a network device.

Optionally, in some implementations, the first processing time is predefined, or configured by the network device. Optionally, in some implementations, the determining module 420 is specifically configured to: if the searchspace for receiving the first DCI is the common searchspace, determine the priority and/or the processing time of the first information according to the RNTI for scrambling the CRC of the first DCI; and/or if the searchspace for receiving the first DCI is the UE-Specific searchspace, determine the priority and/or the processing time of the first information according to the indication field in the first DCI or the RNTI for scrambling the CRC of the first DCI.

Optionally, in some implementations, the determining module 420 is specifically configured to: if the searchspace for receiving the first DCI belongs to one searchspace, determine a priority corresponding to the one searchspace as the priority of the first information, and/or determine a processing time corresponding to the first searchspace as the processing time of the first information; and/or if the searchspace for receiving the first DCI belongs to at least two searchspaces, determine the priority and/or the processing time of the first information according to the indication field in the first DCI or the RNTI for scrambling the CRC of the first DCI.

Optionally, in some implementations, the determining module 420 is specifically configured to: if the resource set for receiving the first DCI belongs to one resource set, determine a priority corresponding to the one resource set as the priority of the first information, and/or determine a processing time corresponding to the first resource set as the processing time of the first information; and/or if the resource set for receiving the first DCI belongs to at least two resource sets, determine the priority and/or the processing time of the first information according to the indication field in the first DCI or the RNTI for scrambling the CRC of the first DCI.

Optionally, in some implementations, the determining module 420 is specifically configured to: if the resource set for receiving the first DCI belongs to the first resource set, determine the priority corresponding to the first resource set as the priority of the first information, and/or determine the processing time corresponding to the first resource set as the processing time of the first information; or if the resource set for receiving the first DCI belongs to the first searchspace, determine the priority corresponding to the first searchspace as the priority of the first information, and/or determine the processing time corresponding to the first searchspace as the processing time of the first information; or if the resource set for receiving the first DCI belongs to a second resource set or a second searchspace, determine the priority and/or the processing time of the first information according to the indication field in the first DCI or the RNTI for scrambling the CRC of the first DCI.

Optionally, in some implementations, the determining module 420 is specifically configured to: determine the priority of the first information according to a first indication field for indicating the priority in the first DCI; or determine, according to a second indication field in the first DCI, the priority of the first information, wherein the second indication field is used for indicating other information except the priority and the processing time.

Optionally, in some implementations, the determining module 420 is specifically configured to: determine the processing time of the first information according to a third indication field for indicating the processing time in the first DCI; or determine, according to the second indication field in the first DCI, the processing time of the first information, wherein the second indication field is used for indicating other information except the priority and the processing time.

Optionally, in some implementations, the determining module 420 is specifically configured to: if the RNTI for scrambling the CRC of the first DCI is a first RNTI, determine the priority of the first information as the first priority, and/or determine the processing time of the first information as the first processing time, or if the RNTI for scrambling the CRC of the first DCI is a second RNTI, determine the priority of the first information as a second priority, and/or determine the processing time of the first information as the second processing time.

Optionally, in some implementations, the determining module 420 is specifically configured to: if the format of the first DCI is a specific DCI format, determine the priority indicated by the first indication field in the first DCI as the priority of the first information, and/or determine the processing time indicated by the third indication field in the first DCI as the processing time of the first information, wherein the specific DCI format includes the first indication field and/or the third indication field; or if the format of the first DCI is another DCI format except the specific DCI format, determine the priority and/or the processing time of the first information according to the second indication field in the first DCI or the RNTI for scrambling the CRC of the first DCI, wherein the second indication field is used for indicating other information except the priority and the processing time.

Optionally, in some implementations, different values of the second indication field are used for indicating different priorities, or different values of the second indication field are used for indicating different processing times.

Optionally, in some implementations, the second indication field is used for indicating at least one of the following: a time domain resource allocation, a Hybrid Automatic Repeat Request (HARQ) process number, or a Physical Downlink Shared Channel (PDSCH)-HARQ feedback timing. Optionally, in some implementations, the determining module 420 is specifically configured to: if the RNTI for scrambling the CRC of the first DCI is the first RNTI, determine the priority of the first information as the first priority and/or determine the processing time of the first information as the first processing time, or if the RNTI for scrambling the CRC of the first DCI is the second RNTI, determine the priority of the first information as the second priority, and/or determine the processing time of the first information as the second processing time.

Optionally, in some implementations, the first priority is predefined, or configured by the network device: and the second priority is predefined, or configured by the network device.

Optionally, in some implementations, the first processing time is predefined, or configured by the network device; and the second processing time is predefined, or configured by the network device.

Optionally, in some implementations, the first RNTI is a Modulation and Coding Scheme-Cell-RNTI (MCS-C-RNTI), and the second RNTI is a Cell Radio Network Temporary Identifier (C-RNTI); or the second RNTI is an MCS-C-RNTI or a C-RNTI, and the first RNTI is another RNTI except the MCS-C-RNTI and the C-RNTI.

Optionally, in some implementations, the determining module 420 is further configured to: if a time domain resource of the first information and a time domain resource of the second information scheduled by the second DCI are at least partially overlapped, determine information to be preferentially transmitted according to the priority of the first information and the priority of the second information.

Optionally, in some implementations, the determining module 420 is specifically configured to: determine the priority of the first information, according to at least one of the indication field in the first DCI, the searchspace for receiving the first DCI, the resource set for receiving the first DCI, the RNTI for scrambling the CRC of the first DCI, or the format of the first DCI; and determine the processing time of the first information according to the priority of the first information.

Optionally, in some implementations, the determining module 420 is further configured to: if the priority of the first information is the first priority, determine the processing time of the first information as the first processing time; or if the priority of the first information is the second priority, determine the processing time of the first information as the second processing time; wherein the first priority is higher than the second priority, and the first processing time is shorter than the second processing time.

Optionally, in some implementations, the first information is first uplink data scheduled by the first DCI, or first downlink data scheduled by the first DCI, or feedback information of the first downlink data scheduled by the first DCI.

Optionally, in some implementations, the above communication module may be a communication interface or a transceiver, or an input/output interface of a communication chip or a system-on-chip, The above determining module may be one or more processors.

It should be understood that the terminal device 400 in accordance with an implementation of the present disclosure may correspond to the terminal device in the method implementation of the present disclosure, and the above-mentioned and other operations and/or functions of various units in the terminal device 400 are respectively used for implementing the corresponding processes of the terminal device in the method 200 shown in FIG. 4, and will not be repeated herein for brevity.

Figure 7:
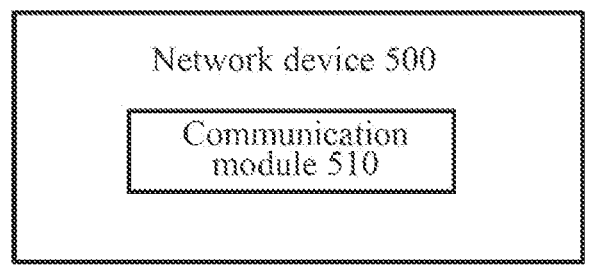
FIG. 7 is a schematic block diagram of a network device in accordance with an implementation of the present disclosure.

FIG. 7 is a schematic block diagram of a network device in accordance with an implementation of the present disclosure. The network device 500 in FIG. 7 includes a communication module 510 and a determining module 520, The communication module 510 is configured to send first Downlink Control Information (DCI), wherein at least one of an indication field in the first DCI, a searchspace for sending the first DCI, a resource set for sending the first DCI, a Radio Network Temporary Identifier (RNTI) for scrambling a Cyclic Redundancy Check (CRC) of the first DCI, or a format of the first DCI is used for determining a priority and/or a processing time of first information scheduled by the first DCI.

Optionally, in some implementations, the network device 500 further includes: a determining module, configured to determine at least one of the indication field in the first DCI, the searchspace for sending the first DCI, the resource set for sending the first DCI, the RNTI for scrambling the CRC of the first DCI, or the format of the first DCI, according to the priority of the first information.

Optionally, in some implementations, the first information is first uplink data scheduled by the first DCI, or first downlink data scheduled by the first DCI, or feedback information of the first downlink data scheduled by the first DCI.

Optionally, in some implementations, the above communication module may be a communication interface or a transceiver, or an input/output interface of a communication chip or a system-on-chip. The above determining module may be one or more processors.

It should be understood that the network device 500 according to an implementation of the present disclosure may correspond to the terminal device in a method implementation of the present disclosure, and the above-mentioned and other operations and/or functions of various units in the network device 500 are respectively for implementing the corresponding flows of the network device in the method 300 as shown in FIG. 5, which will not be repeated here for brevity.

FIG. 1 is a schematic structural diagram of a communication device 600 in accordance with an implementation of the present disclosure. The communication device 600 shown in FIG. 8 includes a processor 610, which may call and run a computer program from a memory to implement the methods in the implementations of the present disclosure.

Figure 8:
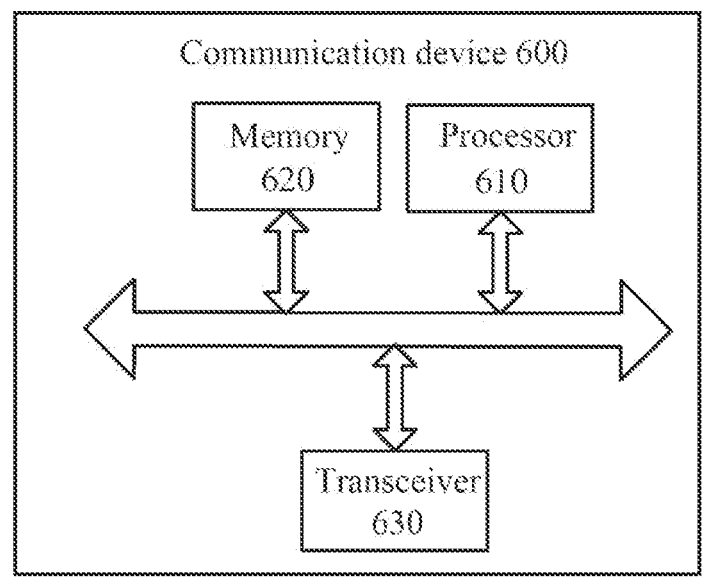
FIG. 8 is a schematic block diagram of a communication device according to another implementation of the present disclosure.

Optionally, as shown in FIG. 8, the communication device 600 may further include a memory 620, Herein, a processor 610 may call and run a computer program from the memory 620 to implement the method in the implementations of the present disclosure.

Herein, the memory 620 may be a separate device independent of the processor 610, or may be integrated in the processor 610.

Optionally, as shown in FIG. 8, the communication device 600 may further include a transceiver 630, and the processor 610 may control the transceiver 630 to communicate with other devices. Specifically, the transceiver 730 may send information or data to other devices or receive information or data sent by other devices.

Herein, the transceiver 630 may include a transmitter and a receiver. The transceiver 630 may further include antennas, the number of which may be one or more.

Optionally, the communication device 600 may be specifically the network device in accordance with the implementations of the present disclosure, and the communication device 600 may implement the corresponding processes implemented by the network device in various methods in the implementations of the present disclosure, which will not be repeated here again for brevity.

Optionally, the communication device 600 may be specifically the mobile terminal/terminal device in accordance with an implementation of the present disclosure, and the communication device 600 may implement the corresponding processes implemented by the mobile terminal/terminal device in various methods in the implementations of the present disclosure, which will not be described repeatedly herein for brevity.

Figure 9:
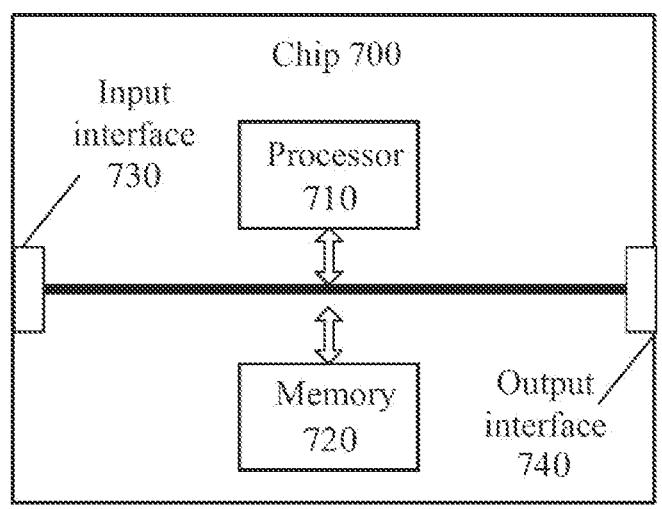
FIG. 9 is a schematic block diagram of a chip according to an implementation of the present disclosure.

FIG. 9 is a schematic structural diagram of a chip according to an implementation of the present disclosure. The chip 700 shown in FIG, 9 includes a processor 710, which may invoke and run a computer program from a memory to implement the method in the implementation of the present disclosure.

Optionally, as shown in FIG. 9, the chip 700 may further include a memory 720. Herein, a processor 710 may call and run a computer program from the memory 720 to implement the method in the implementations of the present disclosure.

Herein, the memory 720 may be a separate component independent of the processor 710, or may be integrated in the processor 710.

Optionally, the chip 700 may further include an input interface 730. Herein, the processor 710 may control the input interface 730 to communicate with other devices or chips, Specifically, the processor 710 may acquire information or data sent by other devices or chips.

Optionally, the chip 700 may further include an output interface 740. Herein, the processor 710 may control the output interface 740 to communicate with other devices or chips. Specifically, the processor 710 may output information or data to other devices or chips.

Optionally, the chip may be applied to the network device in the implementations of the present disclosure, and the chip may implement the corresponding flow implemented by the network device in the various methods in the implementations of the present disclosure, which will not be repeated here for brevity.

Optionally, the chip may be applied to the mobile terminal/terminal device in the implementations of the present disclosure, and the chip may implement the corresponding flow implemented by the mobile terminal/terminal device in the various methods in the implementations of the present disclosure, which will not be repeated here for brevity.

It should be understood that the chip mentioned in the implementations of the present disclosure may also be referred to as a system-level chip, a system chip, a chip system or a system chip on chip, etc.

Figure 10:
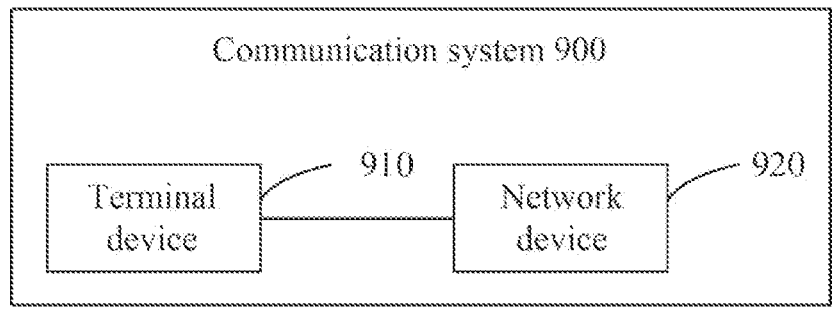
FIG. 10 is a schematic diagram of a communication system according to an implementation of the present disclosure.

FIG. 10 is a schematic block diagram of a communication system 900 provided by an implementation of the present disclosure. As shown in FIG. 10, the communication system 900 may include a terminal device 910 and a network device 920.

Herein, the terminal device 910 may be used for implementing the corresponding functions implemented by the terminal device in the above-mentioned methods, and the network device 920 may be used for implementing the corresponding functions implemented by the network device in the above-mentioned methods, which will not be repeated here for brevity.

It should be understood that the processor in an implementation of the present disclosure may be an integrated circuit chip with a capability for processing signals. In the implementation process, the actions of the method implementations described above may be completed by integrated logic circuits of hardware in the processor or instructions in the form of software.

The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor or the processor may be any conventional processor or the like. The acts of the method disclosed in connection with an implementation of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the acts of the above method in combination with its hardware.

It should be understood that the memory in implementations of the present disclosure may be a transitory memory or non-transitory memory, or may include both transitory and non-transitory memory. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memory is an example for illustration and should not be construed as limiting. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories. An implementation of the present disclosure further provides a computer readable storage medium, configured to store a computer program.

Optionally, the computer readable storage medium may be applied to the network device in the implementations of the present disclosure, and the computer program causes a computer to perform the corresponding processes implemented by the network device in various methods in accordance with the implementations of the present disclosure, which will not be repeated.

here again for brevity.

Optionally, the computer readable storage medium may be applied to the mobile terminal/terminal device in the implementations of the present disclosure, and the computer program causes a computer to perform the corresponding processes implemented by the mobile terminal/terminal device in various methods in accordance with the implementations of the present disclosure, which will not be repeated herein for brevity.

An implementation of the present disclosure further provides a computer program product, including computer program instructions.

Optionally, the computer program product may be applied to the network device in the implementations of the present disclosure, and the computer program instructions cause the computer to perform the corresponding processes implemented by the network device in various methods in accordance with the implementations of the present disclosure, which will not be repeated here again for brevity.

Optionally, the computer program product may be applied to the mobile terminal/terminal device in the implementations of the present disclosure, and the computer program instructions cause a computer to perform the corresponding processes implemented. by the mobile terminal/terminal device in various methods in accordance with the implementations of the present disclosure, which will not be repeated herein for brevity. An implementation of the present disclosure further provides a computer program.

Optionally, the computer program may be applied to the network device in the implementations of the present disclosure. The computer program, when being run on a computer, causes the computer to perform the corresponding processes implemented by the network device in various methods in accordance with the implementations of the present disclosure, which will not be repeated here again for brevity.

Optionally, the computer program may be applied to the mobile terminal/terminal device in the implementations of the present disclosure. The computer program, when running on a computer, causes the computer to perform the corresponding processes implemented by the mobile terminal/terminal device in various methods in accordance with the implementations of the present disclosure, which will not be repeated herein for brevity.

Those of ordinary skill in the art will recognize that the exemplary units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed system, device and method may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection between apparatuses or units through some interfaces, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. And the aforementioned storage medium includes various media, such as a U disk, a mobile hard disk, a Read-Only Memory (ROM), a Random Access Memory (RAM), a magnetic disk, or an optical disk, etc., which may store program codes.

The foregoing are merely exemplary implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure should be subject to the protection scope of the claims.

What is claimed is:

1. A wireless communication method, comprising:
receiving, by a terminal device, first Downlink Control Information (DCI); and
determining, by the terminal device, a priority and/or a processing time of first information scheduled by the first DCI according to at least one of an indication field in the first DCI, a searchspace for receiving the first DCI, a resource set for receiving the first DCI, a Radio Network Temporary Identifier (RNTI) for scrambling a Cyclic Redundancy Check (CRC) of the first DCI, or a format of the first DCI; wherein determining, by the terminal device, the priority and/or the processing time of the first information to be transmitted according to at least one of an indication field in the first DCI, a search space for receiving the first DCI, a resource set for receiving the first DCI, a Radio Network Temporary Identifier (RNTI) for scrambling a Cyclic Redundancy Check (CRC) of the first DCI, or a format of the first DCI, comprises:
when the format of the first DCI is a specific DCI format, determining a priority indicated by a first indication field in the first DCI as the priority of the first information, and/or determining a processing time indicated by a third indication field in the first DCI as the processing time of the first information, wherein the specific DCI format comprises the first indication field and/or the third indication field; or
when the format of the first DCI is another DCI format except the specific DCI format, determining the priority and/or the processing time of the first information according to a second indication field in the first DCI or the RNTI for scrambling the CRC of the first DCI, wherein the second indication field is used for indicating other information except the priority and the processing time.

2. The method of claim 1, wherein determining, by the terminal device, the priority and/or the processing time of the first information to be transmitted according to at least one of an indication field in the first DCI, a search space for receiving the first DCI, a resource set for receiving the first DCI, a Radio Network Temporary Identifier (RNTI) for scrambling a Cyclic Redundancy Check (CRC) of the first DCI, or a format of the first DCI, comprises:
when the format of the first DCI is a specific DCI format, determining a priority indicated by a first indication field in the first DCI as the priority of the first information;
when the format of the first DCI is another DCI format except the specific DCI format, determining the priority of the first information according to the format of the first DCI.

3. The method of claim 2, wherein the other DCI format comprises a DCI format0_0.

4. The method of claim 1, further comprising:
when a time domain resource of the first information and a time domain resource of second information scheduled by a second DCI are at least partially overlapped, determining information to be preferentially transmitted according to the priority of the first information and a priority of the second information.

5. The method of claim 1, wherein the first information is first uplink data scheduled by the first DCI, or first downlink data scheduled by the first DCI, or feedback information of the first downlink data scheduled by the first DCI.

6. A method for wireless communication, comprising:
sending, by a network device, first Downlink Control Information (DCI), wherein at least one of an indication field in the first DCI, a search space for sending the first DCI, a resource set for sending the first DCI, a Radio Network Temporary Identifier (RNTI) for scrambling a Cyclic Redundancy Check (CRC) of the first DCI, or a format of the first DCI is used for determining a priority and/or a processing time of first information scheduled by the first DCI, and
determining at least one of the indication field in the first DCI, the search space for sending the first DCI, the resource set for sending the first DCI, the RNTI for scrambling the CRC of the first DCI, or the format of the first DCI, according to the priority of the first information.

7. The method of claim 6, wherein the first information is first uplink data scheduled by the first DCI, or first downlink data scheduled by the first DCI, or feedback information of the first downlink data scheduled by the first DCI.

8. A terminal device, comprising: a processor and a transceiver, wherein
the transceiver is, configured to receive first Downlink Control Information (DCI); and
the processor is configured to determine a priority and/or a processing time of first information scheduled by the first DCI according to at least one of an indication field in the first DCI, a searchspace for receiving the first DCI, a resource set for receiving the first DCI, a Radio Network Temporary Identifier (RNTI) for scrambling a Cyclic Redundancy Check (CRC) of the first DCI, or a format of the first DCI; wherein the processor is specifically configured to:
when the format of the first DCI is a specific DCI format, determine a priority indicated by a first indication field in the first DCI as the priority of the first information, and/or determine a processing time indicated by a third indication field in the first DCI as the processing time of the first information, wherein the specific DCI format comprises the first indication field and/or the third indication field; or
when the format of the first DCI is another DCI format except the specific DCI format. determine the priority and/or the processing time of the first information according to a second indication field in the first DCI or the RNTI for scrambling the CRC of the first DCI, wherein the second indication field is used for indicating other information except the priority and the processing time.

9. The terminal device of claim 8, wherein the processor is specifically configured to:
when the format of the first DCI is a specific DCI format, determine a priority indicated by a first indication field in the first DCI as the priority of the first information;
when the format of the first DCI is another DCI format except the specific DCI format, determine the priority of the first information according to the format of the first DCI.

10. The terminal device of claim 9, wherein the other DCI format comprises a DCI format0_0.

11. The terminal device of claim 8, wherein the processor is further configured to:
when a time domain resource of the first information and a time domain resource of second information scheduled by a second DCI are at least partially overlapped, determine information to be preferentially transmitted according to the priority of the first information and a priority of the second information.

12. The terminal device of claim 8, wherein the first information is first uplink data scheduled by the first DCI, or first downlink data scheduled by the first DCI, or feedback information of the first downlink data scheduled by the first DCI.

13. A network device, comprising: a processor and a transceiver, wherein
the transceiver is configured to send first Downlink Control Information (DCI), wherein at least one of an indication field in the first DCI, a searchspace for sending the first DCI, a resource set for sending the first DCI, a Radio Network Temporary Identifier (RNTI) for scrambling a Cyclic Redundancy Check (CRC) of the first DCI, or a format of the first DCI is used for determining a priority and/or a processing time of first information scheduled by the first DCI; and
the processor is configured to determine at least one of the indication field in the first DCI, the searchspace for sending the first DCI, the resource set for sending the first DCI, the RNTI for scrambling the CRC of the first DCI, or the format of the first DCI, according to the priority of the first information.

14. The network device of claim 13, wherein the first information is first uplink data scheduled by the first DCI, or first downlink data scheduled by the first DCI, or feedback information of the first downlink data scheduled by the first DCI.

* * * * *

UNITED STATES PATENT AND TRADEMARK OFFICE
CERTIFICATE OF CORRECTION

PATENT NO. : 12,177,862 B2
APPLICATION NO. : 17/579551
DATED : December 24, 2024
INVENTOR(S) : Jing Xu et al.

Page 1 of 1

It is certified that error appears in the above-identified patent and that said Letters Patent is hereby corrected as shown below:

On the Title Page

Item (54) and in the Specification Column 1, Lines 1-3, should read:
METHOD FOR CONFIRMING SERVICE PRIORITY IN WIRELESS COMMUNICATION, TERMINAL DEVICE AND NETWORK DEVICE Signed and Sealed this
Eleventh Day of February, 2025

Coke Morgan Stewart
*Acting Director of the United States Patent and Trademark Office*